United States Patent [19]
Monier

[11] Patent Number: 5,948,051
[45] Date of Patent: Sep. 7, 1999

[54] DEVICE IMPROVING THE PROCESSING SPEED OF A MODULAR ARITHMETIC COPROCESSOR

[75] Inventor: Guy Monier, Rognac, France

[73] Assignee: SGS-Thomson Microelectronics S.A., Saint Genis, France

[21] Appl. No.: 08/779,453

[22] Filed: Jan. 7, 1997

[30] Foreign Application Priority Data

Jan. 15, 1996 [FR] France .................................. 96 00510

[51] Int. Cl.⁶ ..................................................... G06F 7/72
[52] U.S. Cl. .......................................... 708/492; 708/491
[58] Field of Search ................................. 364/746.1, 746

[56] References Cited

U.S. PATENT DOCUMENTS

| | | | |
|---|---|---|---|
| 5,513,133 | 4/1996 | Cressel et al. ........................... | 364/746 |
| 5,742,534 | 4/1998 | Monier .................................. | 364/746.1 |
| 5,745,398 | 4/1998 | Monier .................................. | 364/746.1 |
| 5,751,620 | 5/1998 | Monier .................................. | 364/746.1 |
| 5,764,554 | 6/1998 | Monier ................................... | 364/746 |
| 5,777,916 | 7/1998 | Monier .................................. | 364/746.1 |

FOREIGN PATENT DOCUMENTS

A-0 601 907   6/1994   European Pat. Off. .......... G06F 7/72

*Primary Examiner*—David H. Malzahn
*Attorney, Agent, or Firm*—Wolf, Greenfield & Sacks, P.C.

[57] ABSTRACT

Disclosed is an integrated circuit device enabling the computation of multiplication of A by B, especially a computation of the $P_{field}(A,B)_N$ type as defined in the Montgomery method, using a subdivision into words of Bt bits to carry out the different computations. This device is improved by the addition of a register of m * Bt bits containing the totality of the data element A. The invention also relates to a device for the implementation of a modular $P_{field}(A,B)_N$ operation according to the Montgomery method using the improved device presented by the invention.

27 Claims, 3 Drawing Sheets

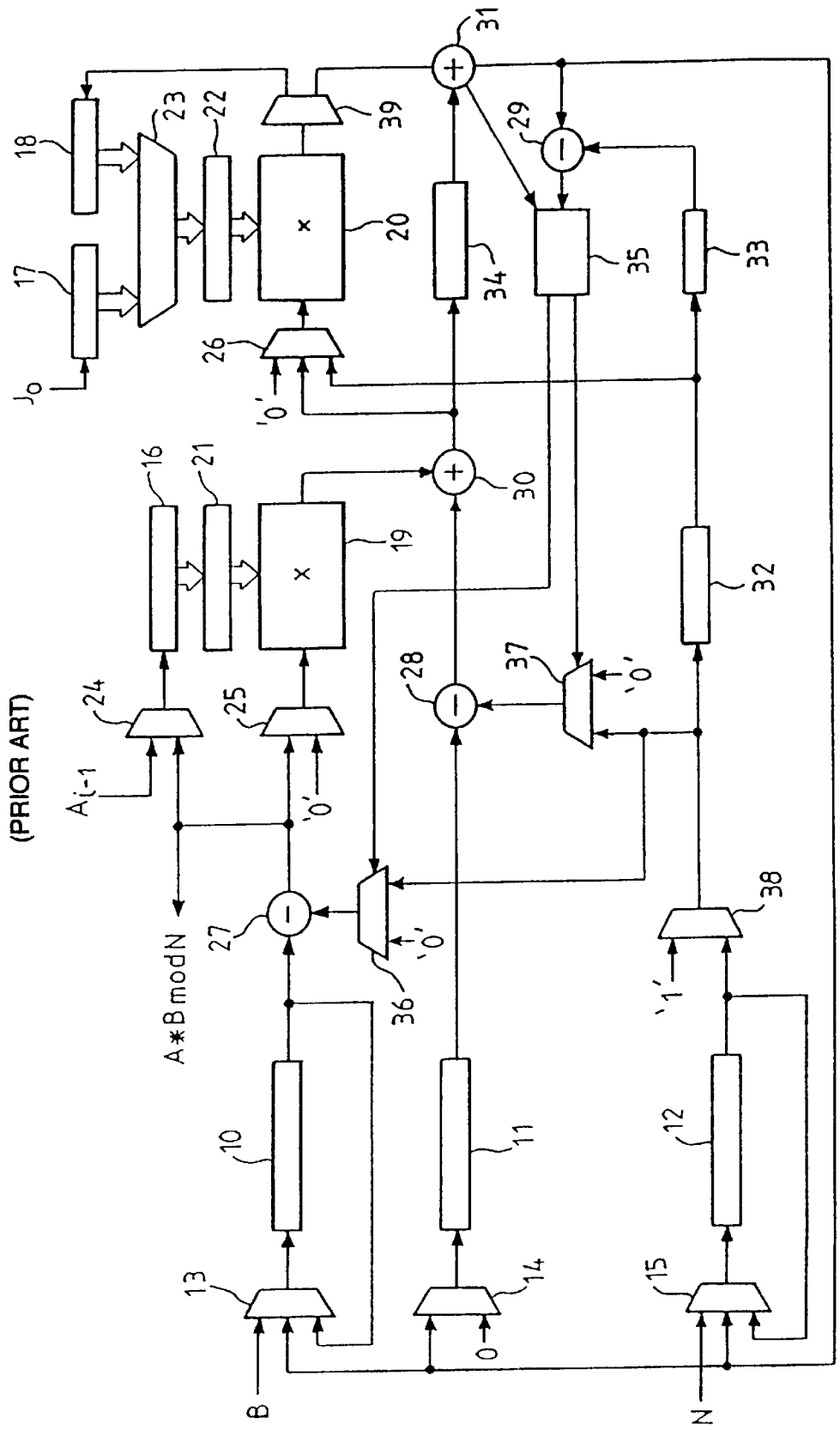
FIG_1 (PRIOR ART)

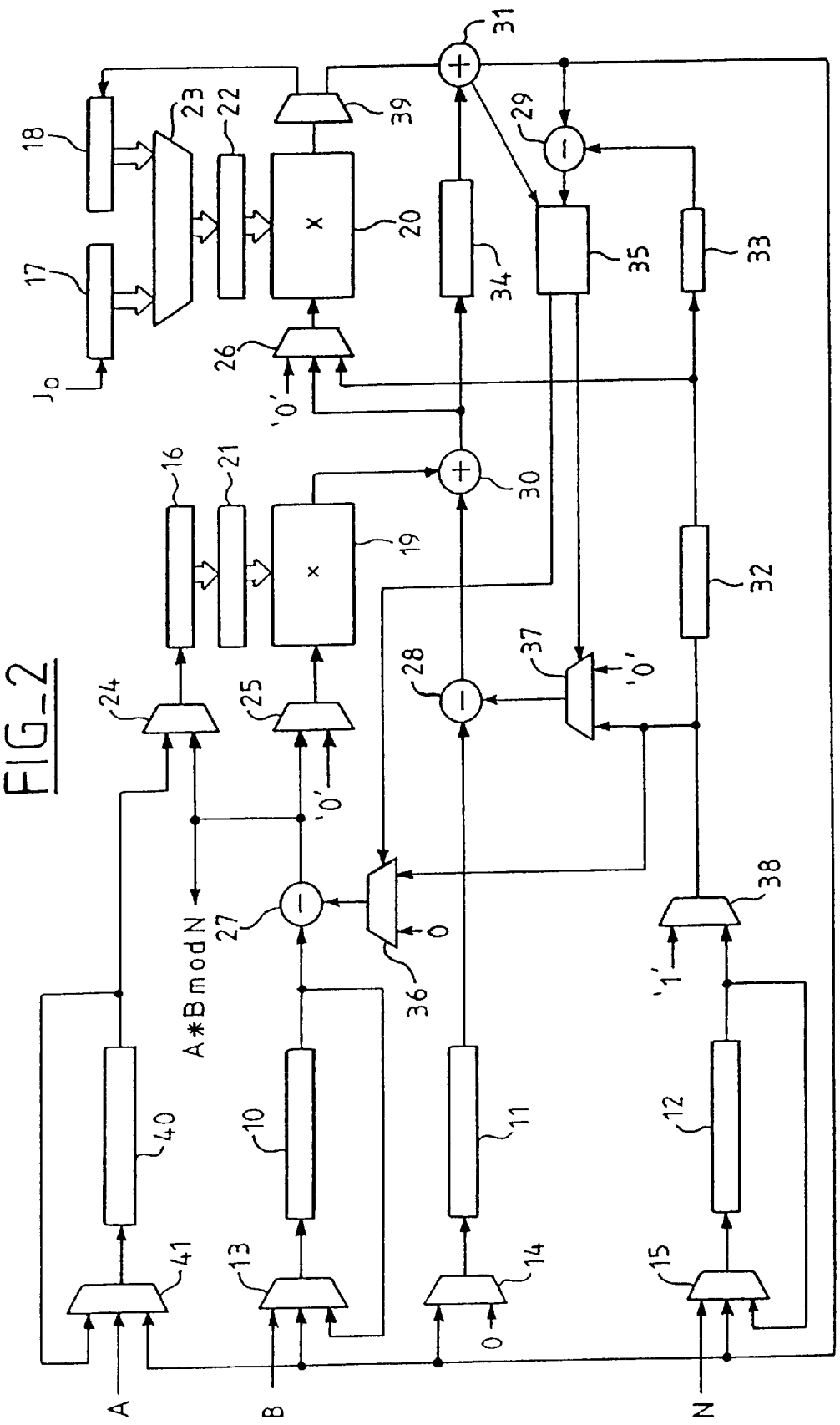
FIG_2

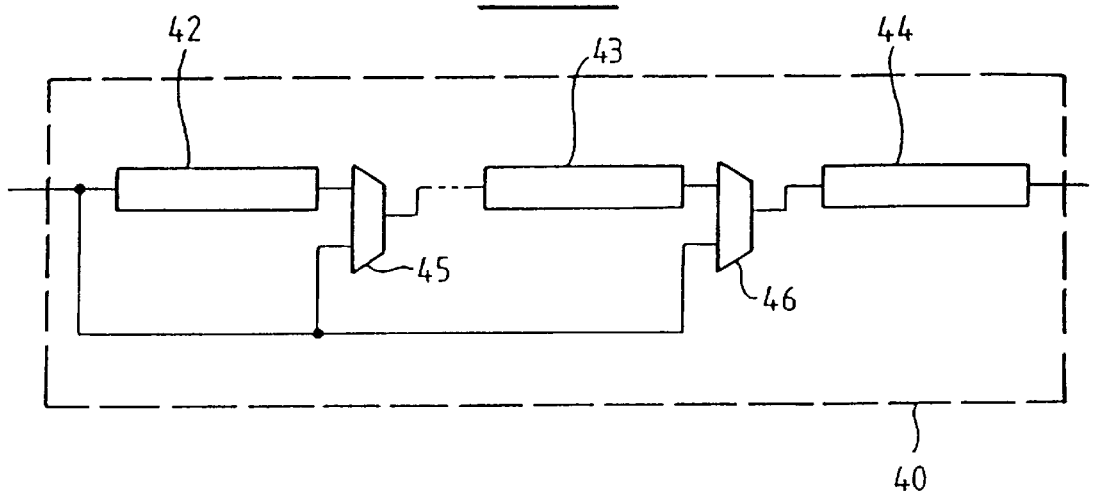
FIG_3

DEVICE IMPROVING THE PROCESSING SPEED OF A MODULAR ARITHMETIC COPROCESSOR

BACKGROUND OF THE INVENTION

1. Field of the Invention

The invention relates to a device to improve the processing speed of a modular arithmetic coprocessor that is used in the implementation of modular operations according to the Montgomery method. Modular operations according to the Montgomery method enable the performance of modular computations in a finite field denoted $GF(2^n)$ (namely a Galois field with $2^n$ elements) without carrying out any division.

2. Discussion of the Related Art

Conventionally, modular operations on $GF(2^n)$ are used in cryptography for applications such as the authentication of messages, the identification of a user and the exchange of keys. Such exemplary applications are described for example in the French patent application published under No. 2 679 054.

There are commercially available integrated circuits dedicated to such applications. These include, for example the product referenced ST16CF54 manufactured by SGS-THOMSON MICROELECTRONICS S.A., built around an association of the type comprising a central processing unit and an arithmetic coprocessor and dedicated to the performance of modular computations. The coprocessor used enables the processing of operations of modular multiplication by using the Montgomery method. It is the object of a European patent application filed under the reference No. 0 601 907 A2, and is illustrated in FIG. 1 (this FIG. corresponds to FIG. 2 of the European patent application referred to).

This circuit illustrated in FIG. 1 therefore enables the computation of a $P_{field}(A,B)^N$ operation. This $P_{field}(A,B)^N$ operation is equivalent to the performance of the computation $(A * B * I) \mod N$ where I is an error that can be compensated for. Commonly A, B and N are encoded on 256 and 512 bits and, in the near future, will be encoded on 1024 bits. The $P_{field}$ operation uses inter alia multiplication circuits. To reduce the size of these circuits, a working base is used. This working base enables the performance of certain computations on words of Bt bits.

Conventionally, Bt is equal to 32 bits.

The use of a circuit such as that of FIG. 1 to carry out a $P_{field}(A,B)_N$ operation where A, B and N are encoded on $m * Bt$ bits, N is an odd parity value, A is subdivided into m words $A_i$ of Bt bits, is equivalent to performing the following steps:

E1: the resetting of the circuit:
- the software computation of a parameter $J_0$ defined by $((N * J_0)+1) \mod 2^{Bt}=0$,
- the loading of $J_0$ into a first register 17 of Bt bits,
- the loading of B into a second register 10 of $m*Bt$ bits,
- the loading of N into a third register 12 of $m*Bt$ bits,
- the loading of $A_0$ into a fourth register 16 of Bt bits,
- the loading of 0 into a fifth register 11 of $m*Bt$ bits,
- the resetting of a first multiplication circuit 19 and a second multiplication circuit 20,
- the resetting of a first subtraction circuit 27, a second subtraction circuit 28 and a third subtraction circuit 29,
- the resetting of a first addition circuit 30 and a second addition circuit 31, E2: first iteration:
- the loading into a sixth register 21 of the contents of the fourth register 16,
- the performance of different elementary operations in order to carry out the following computations:
  $X=A_0 * B$,
  $Y_0=(X * J_0) \mod 2^{Bt}$,
  $Z=X+(N * Y_0)$
  $S=Z\backslash 2^{Bt}$, \being an integer division,
  if S is greater than N, then N is subtracted from S at the next iteration,
  S is loaded into the fifth register 11, E3: following iterations, with i varying from 1 to m-1:
- the loading of $A_i$ into a fourth register 16,
- the loading into a sixth register 21 of the contents of the fourth register 16,
- the performance of different elementary operations in order to carry out the following computations:
  $X=S+A_i * B$,
  $Y_0=(X * J_0) \mod 2^{Bt}$,
  $Z=X+(N * Y_0)$
  $S=Z\backslash 2^{Bt}$, \being an integer division,
  if S is greater than N, then N is subtracted from S at the next iteration,
  S is loaded into the fifth register 11, E4: last iteration, either 0 or N is subtracted from S by means of the subtraction circuit 28, and then this value of S is loaded into the second register 10, E5: the contents of the second register are taken out by means of an output terminal.

For further details of the running of such a method, reference may be made to the patent application EP-A-0 601 907 and more particularly to page 4 line 41 to page 6 line 17 and page 19 lines 7 to 49.

A method of this kind uses a certain number of internal clock cycles and loading clock cycles. Special attention will be paid to the number of cycles of an iteration, for example in the step E3:
- the loading of Ai into a fourth register 16 uses Bt loading clock cycles,
- the loading into the sixth register 21 of the contents of the fourth register 16 uses one internal cycle,
- the performance of the different elementary operations, in which the different computations of the iteration are carried out, does not require waiting for the result of one computation in order to begin the next computation, and uses (m+2) * Bt+x internal clock cycles, x being a number that corresponds to iterations of synchronization and resetting. Hereinafter in this document, x shall be disregarded.

In practice, it is possible to load $A_i$ while carrying out the computations of an iteration, as soon as the contents of the fourth register 16 are loaded into the sixth register 21. There is no problem if the loading clock is the same as the internal clock.

Now, the loading clock depends on a variety of external elements, for example a communications bus that conveys data elements. The system constituted by the central processing unit and coprocessor will have constraints on the setting of the pace of the loading clock which may in practice, for example, be at a frequency of 2 MHz. An integrated circuit on the contrary may permit a cycle period of the order of 10 ns, corresponding to a frequency of 100 MHz internally. The fact of loading Ai during the performance of an iteration provides for a loading cycle time that is m+2 times greater than an internal cycle time, so as not to slow down the process. In other words, this makes it possible to have an internal processing frequency at least equal to m+2 times the loading frequency without any slowing down of the processing operation by the loading.

In practice, a working base of 32 bits is used with 256-bit words or 512-bit words. This corresponds to m=8 or 16. At worst, this enables an internal processing frequency that is only ten times greater than the loading frequency, without being affected by the loading time.

SUMMARY OF THE INVENTION

The invention is aimed at making the internal processing frequency independent of the loading frequency. To achieve this, an additional register of m * Bt bits is added so that A is loaded in a single operation, at the same time as B and N.

An object of the invention therefore is an integrated circuit device enabling the computation of operations of multiplication of A by B, especially a computation of the $P_{field}(A,B)^N$ type as defined in the Montgomery method, using a subdivision into words of Bt bits to carry out the different computations, comprising:

a first register of Bt bits to contain Bt bits of A having one series input and one parallel output, a second, third and fourth shift register of m * Bt bits, m being an integer greater than 1, having one series input and one series output, these registers containing B, N and the result, wherein there is added a fifth shift register of m * Bt bits, in order to contain m * Bt bits of A, a series input of this fifth register being connected to an input terminal, and a series output of this fifth register being connected to the input of the first register.

The added fifth register enables the storage of the data element A in its totality during the loading of the other data elements of identical size and will replace the external loading of the different portions of Bt bits of A.

Advantageously, an additional register of variable size is used to provide greater flexibility of use.

An object of the invention also is a method for the implementation of a modular $P_{field}(A,B)^N$ operation according to the Montgomery method wherein the method comprises the following steps:

E1: computing a parameter $J_0$ encoded on Bt bits, with $J_0 = -N_0^{-1} \mod 2^{Bt}$, $N_0$ being a most significant word of a modulo N operation, and loading $J_0$ into a first register of Bt bits;

E2: loading a multiplicand A, a multiplier B and a modulo N value into respective n-bit registers, with n=m * Bt, and resetting another n-bit register, the contents of this register being denoted as S, with S as a binary variable data element encoded on n bits;

E3: setting up a loop, indexed by an index i, with i varying from 1 to m, each ith iteration comprising the following operations:

a) rightward shifting by Bt bits the register containing A, loading these Bt bits corresponding a word $A_i$ of A into a second register of Bt bits, b) transforming the ith word $A_{i-1}$ of the multiplicand A from the second register to a storage register, c) producing a value $X(i)=S(i-1)+B * A_{i-1}$ with $S(0)=0$ and $S(i-1)$ as the so-called updated value of S, d) producing a value $Y_0(i)=X_0(i) * J_0 \mod 2^{Bt}$, e) computing a value $Z(i)=X(i)+Y_0(i) * N$ f) not taking account of the least significant word of Z(i) and storing the remaining words, namely $Z(i)/2^{Bt}$, in the register containing S, g) performing a bit-by-bit comparison of $Z(i)/2^{Bt}$ with N in order to determine the updated value S(i) of the next iteration, in the manner described here above, this comparison being done through the bit-by-bit subtraction of $Z(i)/2^{Bt}$ and N in a series subtraction circuit, N having been delayed by Bt additional cycles, E4: at the mth iteration, disregarding the least significant word of Z(m) and entering the remaining words, namely $Z(m)/2^{Bt}$, into the register containing B; and E5: outputting the result stored in the register containing B at the last iteration, possibly subtracting N if necessary.

A method of this kind enables efficient management of the fact of having a register containing the value A in its totality. On the basis of the same idea, the invention also proposes a method of exponentiation using several $P_{field}$ operations and enabling a computation that carries out very little loading of data elements from the exterior of the circuit, thus improving the processing speed.

BRIEF DESCRIPTION OF THE DRAWINGS

The invention will be understood more clearly and other features and advantages shall appear from the following non-restrictive description, made with reference to the appended drawings, of which:

FIG. 1 shows a prior art arithmetic coprocessor,

FIG. 2 shows this same coprocessor after modification according to the invention, FIG. 3 shows a preferred embodiment of the additional register having a variable size.

DETAILED DESCRIPTION

FIG. 1 shows a modular arithmetic coprocessor according to the prior art. This coprocessor is used in particular to carry out the elementary operation known as a $P_{field}$ operation defined by the Montgomery method. This coprocessor has the following elements:

three shift registers 10, 11 and 12 with m * Bt bits having one input and one series output, designed to receive respectively the multiplier B, the result S and the modulo N, a multiplexer 13 with three series inputs and one series output, the series output being connected to the input of the register 10, a first input being connected to a first input terminal, a second input being connected to the output of the register 10, a multiplexer 14 with two series inputs and one series output, the series output being connected to the input of the register 11, a first input being connected to a logic zero, a multiplexer 15 with three series inputs and one series output, the series output being connected to the input of the register 12, a first input being connected to a second input terminal, a second input being connected to the output of the register 12, three shift registers 16, 17 and 18 with Bt bits, having one series input and one parallel output, designed to receive respectively Bt bits of the multiplicand A, a computation parameter referenced J0, an intermediate result referenced Y0, the input of the register 17 being connected to a third input terminal, two multiplication circuits 19 and 20 each having a series input, a parallel input of Bt bits and a series output, two registers 21 and 22 of Bt bits having an input and a parallel output, the input of the register 21 being connected to the output of the register 16, the output of the register 21 being connected to the input of the multiplication circuit 19, the output of the register 22 being connected to the input of the multiplication circuit 20, p1 a multiplexer 23 with two parallel inputs and one parallel output, a first input of the multiplexer 23 being connected to the output of the register 17, a second input of the multiplexer 23 being connected to the output of the register 18, the output of the multiplexer 23 being connected to the input of the register 22, two multiplexers 24, 25 each having two series inputs and one series output, the output of the multiplexer 24 being connected to the input of the register 16, a first input of the multiplexer 24 being connected to a fourth input terminal, the output of the multiplexer 25 being connected to the series input of the multiplication circuit 19, a first input of the multiplexer 25 being connected to a logic zero, a multiplexer 26 having three series inputs and one output, the output being connected to the series input of the multiplication circuit 20, a first input being connected to a logic zero, three subtraction circuits 27, 28 and 29 each comprising two series inputs and one series output, the first input of the circuit 27 being connected to the output of the register 10, the output of the circuit 27 being connected to each of the second inputs of the multiplexers 24 and 25 and also to an output terminal, the first input of the circuit 28 being connected to the output of the register 11, two addition circuits 30 and 31, each having two series inputs and one series output, the first input of the circuit 30 being connected to the output of the circuit 28, the second input of the circuit 30 being connected to the output of the circuit 19, the output of the circuit 30 being connected to a second input of the multiplexer 26, the output of the circuit being connected to a first input of the circuit 29 but also to a second input of the multiplexer 14 and also to each of the third inputs of the multiplexer 13 and 15, three delay cells 32, 33 and 34 which are actually shift registers of Bt bits, having one input and one series output, the output of the cell 32 being connected firstly to a third input of the multiplexer 26 and secondly to the input of the cell 33, the output of the cell 33 being connected to a second input of the circuit 29, the input of the cell 34 being connected to the output of the circuit 30, the output of the cell 34 being connected to a first input of the circuit 31, a comparison circuit 35 having two series inputs and two outputs, a first input being connected to the output of the circuit 31, a second input being connected to the output of the circuit 29, two multiplexers 36 and 37, each having two series inputs, one selection input, one output, each of the first series inputs being connected to a logic zero, each of the selection inputs being connected to one of the outputs of the circuit 35, the output of the multiplexer 36 being connected to a second input of the circuit 27, the output of the multiplexer 37 being connected to a second input of the circuit 28, a multiplexer 38 having two inputs and one output, a first input being connected to a logic "one", a second input being connected to the output of the register 12, the output being connected firstly to the input of the cell 32 and secondly to the second inputs of the multiplexers 36 and 37, a demultiplexer 39 having one input and two outputs, the input being connected to the output of the circuit 20, a first output being connected to the input of the register 18, a second output being connected to a second input of the circuit 31.

For further details on the making of certain elements, reference may be made to European patent no. EP-A-0 601 907.

With a circuit of this kind or with one of its close variants, the performance of a $P_{field}(A,B)^N$ operation can take place in different ways. In any case, we have the following structure: the multiplicand A is subdivided into m words of Bt bits $A_0$ to $A_{m-1}$:

E1: the external computation of a parameter $J_0$ encoded on Bt bits, with $J_0 = -N_0^{-1}$ mod $2^{Bt}$, $N_0$ being the least significant bit of the modulo N, and the loading of $J_0$ in the Bt-bit register 17.

E2: the loading of the multiplier B and of the modulo N in respective n-bit registers 10 and 12, with n=m * k, and the resetting of the n-bit register 11 at zero, the contents of this register being denoted S, with S as a variable binary data element encoded on n bits.

E3: the setting up of a loop, indexed by an index i, with i varying from 1 to m, each ith iteration comprising the following operations:

a) the loading of the word $A_i$ into the register 16, b) the transfer of the ith word $A_{i-1}$ of the multiplicand A from a register 16 to a storage register 21, c) the production of a value X(i)=S(i-1)+B * $A_{i-1}$ with S(0)=0 and S(i-1) as the so-called updated value of S, d) the production of a value $Y_0(i)=X_0(i)$ * $J_0$ mod 2Bt, e) the computation of a value Z(i)=X(i)+$Y_0(i)$ * N f) not taking account of the least significant word of Z(i) and storing the remaining words, namely $Z(i)/2^{Bt}$, in the register containing S, g) the performance of a bit-by-bit comparison of $Z(i)/2^{Bt}$ with N in order to determine the updated value S(i) of the next iteration, in the manner described here above, this comparison being done through the bit-by-bit subtraction of $Z(i)/2^{Bt}$ and N in a second series subtraction circuit 29, N having been delayed by Bt additional cycles, E4: at the mth iteration, disregarding the least significant word of Z(m) and entering the remaining words, namely $Z(m)/2^{Bt}$, into the register containing B; and E5: the output of the result stored in the register 10 at the last iteration, possibly subtracted from N if necessary.

By way of an example, it is possible to use the following step E3 which works on the circuit of FIG. 1:

E3: the setting up of a loop, indexed by an index i, with i varying from 1 to m, each ith iteration comprising the following operations:

a) the loading of the word A-1 into the register 16, b) the transfer of the ith word $A_{i-1}$, of the multiplicand A from a register 16 to a storage register 21, c) the production of a value X(i)=S(i-1)+B * $A_{i-1}$ with S(0)=0 and S(i-1) as the so-called updated value of S, defined here below, in:

I—making a rightward shift of the contents of the register 10 towards the input of a first series-parallel multiplication circuit 19 with the looping of the output of the register 10 to its input, II—multiplying the bits of B by $A_{i-1}$, III—making a rightward shift of the contents of the register 12, with looping of the output to the input, IV—determining the updated value of S(i−1) as being the value stored in the register 11 after the (i−1)th iteration if this stored value is smaller than N and, if this iteration is greater than N, making a series subtraction of N from this stored value in a first series subtraction circuit 28, the value that results therefrom being the updated value of S(i−1), and V—making a rightward shift of the contents of the register 11 and carrying out a bit-by-bit addition of the value of the multiplication B * $A_{i-1}$ with the updated value of S(i−1) in a first series addition circuit 30, d) the production of a value $Y_0(i)=X_0(i) * J_0$ mod $2^{Bt}$ in multiplying the least significant word of X(i), $X_0(i)$, by $J_0$ in a second series-parallel multiplication circuit 20, and the entering of the value $X_0(i) * J_0$ mod $2^{Bt}=Y_0(i)$ in a register 18, and simultaneously the delaying of N and X(i) by Bt cycles in the delay cells 32 and 34, e) the computation of a value $Z(i)=X(i)+Y_0(i) * N$ by:

I—multiplying $Y_0(i)$ by N, delayed by Bt cycles, in the second multiplication circuit 20, and II—adding X(i) to the value $Y_0(i) * N$ in a second series addition circuit 31, f) not taking account of the least significant word of Z(i) and storing the remaining words, namely $Z(i)/2^{Bt}$, in the register 11, g) making a bit-by-bit comparison of $Z(i)/2^{Bt}$ with N in order to subsequently determine the updated value S(i) in the manner described here above, this comparison being done through the bit-by-bit subtraction of $Z(i)/2^{Bt}$ and N in a second series subtraction circuit 29, N having been delayed by Bt additional cycles.

Those skilled in the art will have no difficulty understanding that the step a) which consists in loading the word $A_{i-1}$ into the register 16 may be done during the running of the rest of the step E3 so that there is no wait for the loading.

However, it has been seen here above that the running of a loop without counting the loading uses (m+2) * Bt clock cycles and that the loading uses Bt loading clock cycles. Should the internal sequencing clock used be one of far higher speed than the loading clock, it is always possible to have to wait for the end of the loading of each word of A.

In FIG. 2 therefore, the invention proposes the addition of a shift register 40 with m * Bt bits, having an input and a series output, the output of this register 40 being connected to the first input of the multiplexer 24 instead of the fourth input terminal. Since this register 40 is used to store the multiplicand A in its totality, it is not necessary to carry out a loading at each iteration. Indeed, all the data elements needed to compute the operation $P_{field}$ will be loaded, preferably simultaneously. To enable A to be preserved, it is preferable to loop the output to the input of this register 40. For this purpose, the invention provides for a multiplexer 41 with three inputs and one output, the output being connected to the input of the register 40, the first input being connected to the output of the register 40, the second input being connected to the fourth input terminal and the third input terminal being connected to the output of the circuit 31.

With a circuit of this kind, an operation $P_{field}(A,B)^N$, runs as follows, the multiplicand A being subdivided into m words of Bt bits $A_0$ to $A_{m-1}$:

E1: The external computation of a parameter $J_0$ encoded on Bt bits, with $J_0=-N_0^{-1}$ mod $2^{Bt}$, $N_0$ being the least significant bit of the modulo N, and the loading of $J_0$ in the Bt-bit register 17, E2: The loading of the multiplicand A, the multiplier B and the modulo N into the respective n-bit registers 10 and 12, with n=m * k, and the resetting of the n-bit register 11 at zero, the contents of this register being denoted S, with S as a variable binary data element encoded on n bits, E3: the setting up of a loop, indexed by an index i, with i varying from 1 to m, each ith iteration comprising the following operations:

a) the rightward shifting by Bt bits of the register 40, the loading of these Bt bits corresponding to a word $A_i$ of A into the register 16, b) the transfer of the ith word $A_{i-1}$ of the multiplicand A from a register 16 to a storage register 21, c) the production of a value $X(i)=S(i-1)+B * A_{i-1}$ with S(0)=0 and S(i−1) as the so-called updated value of S, d) the production of a value $Y_0(i)=X_0(i) * J_0$ mod $2^{Bt}$, e) the computation of a value $Z(i)=X(i)+Y_0(i) * N$ f) not taking account of the least significant word of Z(i) and storing the remaining words, namely $Z(i)/2^{Bt}$, in the register 11, g) the performance of a bit-by-bit comparison of $Z(i)/2^{Bt}$ with N in order to determine the updated value S(i) of the next iteration, in the manner described here above, this comparison being done through the bit-by-bit subtraction of $Z(i)/2^{Bt}$ and N in a second series subtraction circuit 29, N having been delayed by Bt additional cycles, E4: at the mth iteration, disregarding the least significant word of Z(m) and entering the remaining words, namely $Z(m)/2^{Bt}$, into the register 10; and E5: the output of the result stored in the register 10 at the last iteration, possibly subtracted from N if necessary.

Naturally, the step a) can be done during the rest of the step E3 (except for the first time). Preferably, this step E3 a) is done by a shift by m * Bt bits of the register 40 containing A and a loading of Bt bits corresponding to a word $A_i$ of A into the register 16 of Bt bits during said shift by m * Bt bits.

Another advantage of such a device is that it is possible to carry out a modular exponentiation $A^c$ mod N, C being encoded c bits and C having its most significant bit equal to 1, in performing only one data loading operation. Indeed, a modular exponentiation runs as follows:

the performance of the step E1, the computation of an error correction parameter $H=2^{2*m*Bt}$ mod N, the performance of the step E2 in taking the correction parameter H as the value for the multiplier B, the performance of the steps E3 and E4 with the simultaneous loading of the result into the first and second registers (10 and 40), this result being referenced A' which is equal to $(A * 2^{m*Bt})$ mod N, the setting up of a loop indexed by an index J, J valuing from c-2 to 0:

B1: the performance of a step E3 in using the contents of the second register (10) instead of first register (40), this step being done by the loading, before the first iteration, of the Bt first bits of the second register (10) in the fifth register (16) in achieving a shift by m * Bt bits of this second register (10), the output of this second register (10) being looped to its input and during the following iterations in loading the following Bt bits of B into the fifth register (16) during the iteration, the result being stored into the second register (10), B2: if the bit of C with a place value $2^J$ is equal to one, then the step E3 is performed, A' being already present in the first register (40), and B being already present in the second register (10), and the step E4 is performed, the loading of a data element with a value "1+, encoded on m * Bt bits, in the first register (40), the performance of a step E3, "1" being in the first register (40) and B being in the second register (10), and the performance of the step E4, the performance of a step E5.

With the device of the invention, the central processing unit working in collaboration with the coprocessor no longer has to see to the loading of data elements in the coprocessor and therefore may be concerned only with instructions to be sent to the coprocessor in the case of modular exponentiation.

In a standard way, we have m=8 or 16. It is therefor preferable to have a variable size register for this first reason. Another reason that enforces the use of variable size registers is the fact of being able to perform computations solely on the working base Bt. The invention therefore proposes the use of a variable size register. The invention proposes for example the register 40 as shown in FIG. 3. This register 40 has:

a first shift sub-register 42 with k * Bt bits, having one input and one series output, the input of this register 42 being merged with the input of the register 40, a second shift sub-register 43 with (k−1) * Bt bits, having one input and one series output, a third shift sub-register 44 with Bt bits, having one input and one series output, the output of this register 44 being merged with the output of the register 40, two multiplexers 45 and 46 having two inputs and one output, the first input of each of the multiplexers 45 and 46 being connected to the input of the register 40, the second input of the multiplexer 45 being connected to the output of the first sub-register 42, the second input of the multiplexer 46 being connected to the output of the second sub-register 43, the output of the multiplexer 45 being connected to the input of the second sub-register 43, the output of the multiplexer 46 being connected to the input of the third sub-register 44.

In this example, we have k=8 and Bt=32. This enables the use of the register 40 as a register with a size of 32, 256 or 512 bits. Those skilled in the art will have no problem in extending the modularity of such a register to any number of sub-registers of various sizes, having preferably sizes of a power of 2.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An integrated circuit device enabling the computation of $P_{field}(A,B)^N$ type modular operations as defined in the Montgomery method, using a subdivision into words of Bt bits to carry out the different computations, comprising:

a first register of Bt bits to contain Bt bits of A having one series input and one parallel output;

a second, third and fourth shift register each having m * Bt bits, m being an integer greater than 1, and having one series input and one series output, the second, third and fourth registers containing B, N and a result, respectively;

wherein there is added a fifth shift register of m * Bt bits, in order to contain m * Bt bits of A, a series input of this fifth register being connected to an input terminal, and a series output of this fifth register being connected to the input of the first register.

2. A device according to claim 1, wherein the fifth register has a variable size that is a multiple of Bt.

3. A device according to claim 2, wherein the fifth register has n sub-registers and n-1 two-input multiplexers.

4. A device according to claim 3, wherein the input of the first sub-register is the input of the fifth register, the output of a last sub-register being the output of the fifth register, a first input of a two-input multiplexer being connected to the output of one of the sub-registers, which is not the last sub-register, an output of a two-input multiplexer being connected to the input of one of the sub-registers which is not the first one, and all the second inputs of the two-input multiplexers being connected to the inputs of the fifth register.

5. A device according to claim 1, wherein the input of the fifth register is connected to the output of a three-input multiplexer.

6. A device according to claim 5, wherein a first input of the three-input multiplexer is connected to the output of the fifth register, a second input of the three-input multiplexer being connected to an input terminal of the device, a third input enabling the reception of data elements from the device.

7. A method for the implementation of a modular $P_{field}(A,B)^N$ operation according to the Montgomery method wherein the method comprises the following steps:

E1: computing a parameter $J_0$ encoded on Bt bits, with $J_0 = -N_0^{-1} \mod 2^{Bt}$, $N_0$ being a least significant word of a modulo N operation, and the loading $J_0$ into a first register of Bt bits;

E2: loading a multiplicand A, a multiplier B and a modulo N value into a first, second and third respective n-bit register, with n=m * Bt, and resetting a fourth n-bit register at zero, the contents of this register being denoted S, with S as a binary variable data element encoded on n bits;

E3: setting up a loop, indexed by an index i, with i varying from 1 to m, each ith iteration comprising the following operations:

a) rightward shifting by Bt bits the first register containing A, loading these Bt bits corresponding to a word $A_i$ of A into a fifth register of Bt bits;

b) transferring ith word $A_{i-1}$ of the multiplicand A from the fifth register to a storage register;

c) producing a value $X(i)=S(i-1)+B * A_{i-1}$ with $S(0)=0$ and $S(i-1)$ as the so-called updated value of S;

d) producing a value $Y_0(i)=X_0(i) * J_0 \mod 2^{Bt}$;

e) computing a value $Z(i) X(i)+Y_0(i) * N$;

f) not taking account of the least significant word of $Z(i)$ and storing the remaining words, namely $Z(i)/2^{Bt}$, in the register containing S;

g) performing a bit-by-bit comparison of $Z(i)/2^{Bt}$ with N in order to determine the updated value S(i) of the next iteration, in the manner described here above, this comparison being done through the bit-by-bit subtraction of $Z(i)/2^{Bt}$ and N in a series subtraction circuit, N having been delayed by Bt additional cycles;

E4: at the mth iteration, disregarding the least significant word of Z(m) and entering the remaining words, namely $Z(m)/2^{Bt}$, into the second register containing B; and E5: outputting the result stored in the second register containing B at the last iteration, possibly subtracting N if necessary.

8. A method according to claim 7 wherein, in steps E1 and E2, the loading operations are performed simultaneously.

9. A method according to claim 7, wherein m * Bt bits of the first register containing A are shifted, and wherein Bt bits corresponding to a word $A_i$ of A are loaded into a fifth register of Bt bits during said shift by m * Bt bits.

10. A coprocessor system for the computation of $P_{field}(A, B)^N$ type modular operation as defined in the Montgomery method, using a subdivision into words of Bt bits to carry out the computations, said system comprising:
- a first register of Bt bits to contain Bt bits of A;
- said first register having a series input and a parallel output;
- a second register;
- a third register;
- a fourth register;
- said second, third and fourth registers each being of m*Bt bits, m being an integer greater than 1;
- each of said second, third and fourth registers having a series input and a series output;
- said second, third and fourth registers containing, respectively, the multiplier B, the result S and the modulo N;
- a fifth register of m*Bt bits, in order to contain m*Bt bits of A;
- said fifth register having a series input and a series output;
- an input terminal;
- first circuit means coupling the input terminal to the series input of the fifth register;
- and second circuit means coupling the series output of the fifth register to the series input of the first register.

11. A coprocessor system according to claim 10 wherein the fifth register has a variable size that is a multiple of Bt.

12. A coprocessor system according to claim 11 wherein the fifth register comprises n sub-registers and n−1 two-input multiplexers.

13. A coprocessor system according to claim 12, wherein the input of a first sub-register is the input of the fifth register, the output of a last sub-register being the output of the fifth register.

14. A coprocessor system according to claim 13, wherein a first input of one of the two-input multiplexers is connected to the output of one of the sub-registers, which is not the last sub-register.

15. A coprocessor system according to claim 14 wherein an output of one of the two-input multiplexers is connected to the input of one of the sub-registers which is not the first sub-register.

16. A coprocessor system according to claim 15 wherein the second inputs of all of the two-input multiplexers are connected to the input of the fifth register.

17. A coprocessor system according to claim 10, wherein said first circuit means comprises a first multiplexer.

18. A coprocessor system according to claim 17 wherein said first multiplexer is a three input multiplexer.

19. A coprocessor system according to claim 18 wherein the first input of the three input multiplexer is connected to the output of the fifth register.

20. A coprocessor system according to claim 19 wherein a second input of the three input multiplexer is connected to the input terminal.

21. A coprocessor system according to claim 20 further comprising a third circuit means coupling to a third input of the three input multiplexer.

22. A coprocessor system according to claim 21 wherein said second circuit means comprises a second multiplexer.

23. A coprocessor system according to claim 22 wherein said second multiplexer is a two-input multiplexer having one input coupled from the output of the fifth register.

24. A coprocessor system according to claim 10 wherein said first circuit means comprises a first multiplexer.

25. A coprocessor system according to claim 24 wherein said second circuit means comprises a second multiplexer.

26. A coprocessor system according to claim 25 wherein the first multiplexer has an input that is coupled from the output of the fifth register.

27. A method of modular exponentation $A^c$ mod N, using a modular $P_{field}(A,B)^N$ according to the Montgomery method, C being encoded on c bits and C having its most significant bit equal to 1 wherein the method comprises the following steps:
- computing a parameter $J_0$ encoded on Bt bits, with $J_0 = -N_0^{-1}$ mod $2^{Bt}$, $N_0$ being a least significant word of a modulo N operation, and the loading $J_0$ into a first register of Bt bits;
- computing an error correction parameter $H = 2^{2*m*Bt}$ mod N;
- loading A, B and N value into first, second and third respective n-bits register, with n=m * Bt, and resetting a fourth n-bits register at zero, the contents of this register being denoted S, with S as a binary variable data element encoded on n bits;
- setting a loop, indexed by an index i, with i varying from 1 to m, each ith iteration comprising the following operations:
  a) rightward shifting by Bt bits the first register containing A, loading these Bt bits corresponding to a word $A_i$ of A into a fifth register of Bt bits;
  b) transferring ith word $A_{i-1}$ of A from the fifth register to a storage register;
  c) producing a value $X(i)=S(i-1)+B * A_{i-1}$ with $S(0)=0$ and $S(I-1)$ as the so-called updated value of S;
  d) producing a value $Y_0(i)=X_0(i) * J_0$ mod $2^{Bt}$;
  e) computing a value $Z(i)=Y_0(i) * N$;
  f) not taking account of the least significant word of Z(i) and storing the remaining words, namely $Z(I)/2^{Bt}$, in the fourth register containing S;
  g) performing a bit-by-bit comparison of $Z(i)/2^{Bt}$ and N in a series subtraction circuit, N having been delayed by Bt additional cycles;
- at the m'th iteration, disregarding the least significant word of Z(m) and entering the remaining words, namely $Z(m)/2^{Bt}$, into the first and second registers, the contains of the first register being called A', and the contains of the second register being called B;
- setting up a loop indexed by an index j, with j varying from c-2 to 0;
- rightward shifting by m * Bt bits the second register containing B;
- setting a loop, indexed by an index i, with i varying from 1 to m, each ith iteration comprising the following operations:
  a) during the last rightward shifting by m * Bt bits of the second register containing B, loading the Bt bits corresponding to a word $B_i$ of B into a fifth register of Bt bits;
  b) transferring ith word $B_{i-1}$ of B from the fifth register to a storage register;
  c) producing a value $X(i)=S(i-1)+B * B_{i-1}$ with $S(0)=0$ and $S(i-1)$ as the so-called updated value of S;
  d) producing a value $Y_0(i)=X_0(i) * J_0$ mod $2^{Bt}$,
  e) computing a value $Z(i)=X(i)+Y_0(i) * N$;

f) not taking account of the least significant word of Z(i) and storing the remaining words, namely $Z(i)/2^{Bt}$, in the fourth register containing S;

g) performing a bit-by-bit comparison of $Z(i)/2^{Bt}$ and N. in a series subtraction circuit, N having been delayed by Bt additional cycles;

h) during step c) to g), rightward shifting by m * Bt bits the second register containing B;

at the m'th iteration, disregarding the least significant word of Z(m) and entering the remaining words, namely $Z(m)/2^{Bt}$, into the second register containing B;

if the bit of C with a place value $2^j$ is equal to 1, then:

setting a loop, indexed by an index i, with i varying from 1 to m, each ith iteration comprising the following operations:

a) rightward shifting by Bt bits the first register containing A', loading these Bt bits corresponding to a word $A'_i$ of A' into a fifth register of Bt bits;

b) transferring ith word $A^°_{i-1}$ of A' from the fifth register to a storage register;

c) producing a value $X(i)=S(i-1)+B * A'_{i-1}$ with $S(0)=0$ and $S(i-1)$ as the so-called updated value of S;

d) producing a value $Y_0(i)=X_0(i) * J_0 \bmod 2^{Bt}$;

e) computing a value $Z(i)=X(i)+Y_0(i) * N$;

f) not taking account of the least significant word of Z(I) and storing the remaining words, namely $Z(I)/2^{Bt}$, in the fourth register containing S;

g) performing a bit-by-bit comparison of $Z(i)/2^{Bt}$ and N in a series subtraction circuit, N having been delayed by Bt additional cycles;

at the m'th iteration, disregarding the least significant word of Z(m) and entering the remaining words, namely $Z(m)/2^{Bt}$, into the second registers containing B;

loading a data element ONE being equal to "1", encoded on i * Bt bits, into the first register;

setting a loop, indexed by an index i, with i varying from 1 to m, each ith iteration comprising the following operations:

a) rightward shifting by Bt bits the first register containing ONE, loading these bits corresponding to a word $ONE_i$ of ONE into a fifth register of Bt bits;

b) transferring ith word $ONE_{i-1}$ of ONE from the fifth register to a storage register;

c) producing a value $X(i)=S(i-1)+B * ONE_{i-1}$ with $S(0)=0$ and $S(i-1)$ as the so-called updated value of S;

d) producing a value $Y_0(i)=X,(i) * J_0 \bmod 2^{Bt}$;

e) computing a value $Z(i)=X(i)+Y_0(i) * N$;

f) not taking account of the least significant word of Z(i) and storing the remaining words, namely $Z(i)/2^{Bt}$, in the fourth register containing S;

g) performing a bit-by-bit comparison of $Z(i)/2^{Bt}$ and N in a series subtraction circuit, N having been delayed by Bt additional cycles;

at the m'th iteration, disregarding the least significant word of Z(m) and entering the remaining words, namely $Z(m)/2^{Bt}$, into the second register containing B; outputting the result stored in the second register containing B at the last iteration, possibly N if necessary.

* * * * *